United States Patent
Keum et al.

(10) Patent No.: US 11,955,852 B2
(45) Date of Patent: Apr. 9, 2024

(54) OLEOPHILIC SURFACE TREATMENTS FOR ENHANCED HEAT-TRANSFER CHARACTERISTICS OF ELECTRIC MACHINES

(71) Applicant: GM GLOBAL TECHNOLOGY OPERATIONS LLC, Detroit, MI (US)

(72) Inventors: SeungHwan Keum, Northville, MI (US); Mei Yang, Troy, MI (US); Neal Parsons, Onsted, MI (US); Ruth Herrera Reed, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 39 days.

(21) Appl. No.: 17/367,853

(22) Filed: Jul. 6, 2021

(65) Prior Publication Data

US 2023/0011641 A1    Jan. 12, 2023

(51) Int. Cl.
*H02K 15/12* (2006.01)
*H02K 3/12* (2006.01)
(Continued)

(52) U.S. Cl.
CPC .............. *H02K 15/12* (2013.01); *H02K 3/12* (2013.01); *H02K 3/44* (2013.01); *H02K 9/19* (2013.01);
(Continued)

(58) Field of Classification Search
CPC ........ H02K 9/19; H02K 2209/00; H02K 3/12; H02K 3/44; H02K 15/12; H05K 15/12; H05K 3/12
See application file for complete search history.

(56) References Cited

U.S. PATENT DOCUMENTS 7,239,055 B2    7/2007  Burgman et al.
7,307,363 B2   12/2007  Pashnik et al.
(Continued)

FOREIGN PATENT DOCUMENTS

KR          2013028566 A  *  3/2013
KR         20130028566 A  *  3/2013
WO    WO-2020130200 A1  *  6/2020

OTHER PUBLICATIONS

Shi, Y., Cao, J., and Ehmann, K. F. (Jan. 13, 2021). "Generation of Surfaces With Isotropic and Anisotropic Wetting Properties by Curved Water Jet-Guided Laser Micromachining." ASME. J. Micro Nano-Manuf. Dec. 2020; 8(4): 041001. https://doi.org/10.1115/1.4049358 (Year: 2020).*

(Continued)

*Primary Examiner* — Livius R. Cazan
(74) *Attorney, Agent, or Firm* — Quinn IP Law

(57) ABSTRACT

Presented are oleophilic surface treatments for electric machines, methods for making/using such electric machines, and vehicles employing traction motors having stator windings with oleophilic treatments on select surfaces. An electric machine includes an outer housing with a direct-cooling thermal management system fluidly connected to the housing to circulate thereto a coolant fluid. A stator assembly, which is attached to the housing, includes a stator core with one or more electromagnetic windings mounted to the stator core. A rotor assembly is movably mounted to the hosing adjacent the stator assembly. The rotor assembly includes a rotor core with one or more magnets mounted to the rotor core spaced, e.g., across an air gap, from the winding(s). Select components of the stator assembly have a target surface with an oleophilic surface treatment that enlarges the target surface's wetted area and (Continued)

increases a coolant mass of the coolant fluid contacting the target surface.

20 Claims, 4 Drawing Sheets

(51) Int. Cl.
  *H02K 3/44* (2006.01)
  *H02K 9/19* (2006.01)
  *H02K 15/02* (2006.01)
(52) U.S. Cl.
  CPC ....... *H02K 15/026* (2013.01); *H02K 2209/00* (2013.01)

(56) References Cited

U.S. PATENT DOCUMENTS

| | | | |
|---|---|---|---|
| 7,545,060 | B2 | 6/2009 | Ward |
| 8,169,110 | B2 | 5/2012 | Swales et al. |
| 8,492,952 | B2 * | 7/2013 | Bradfield ............... H02K 5/203 |
| | | | 310/216.011 |
| 8,508,085 | B2 | 8/2013 | Bradfield |
| 2011/0181136 | A1 | 7/2011 | Nakamori et al. |
| 2012/0161555 | A1 * | 6/2012 | Sawada .................... H02K 3/50 |
| | | | 310/54 |
| 2017/0250588 | A1 * | 8/2017 | Kaiser ...................... H02K 1/16 |
| 2017/0359908 | A1 * | 12/2017 | Fujimura ............... H05K 3/423 |
| 2018/0006532 | A1 * | 1/2018 | Sung ........................ H02K 9/19 |

OTHER PUBLICATIONS

A. Riveiro, P. Pou, J. del Val, R. Comesaña, F. Arias-González, F. Lusquiños, M. Boutinguiza, F. Quintero, A. Badaoui, J. Pou, Laser texturing to control the wettability of materials, Procedia CIRP, vol. 94, (Year: 2020).*

Junfei et al.; Superoleophobic Textured Copper Surfaces Fabricated by Chemical Etching/Oxidation and Surface Fluorination. ACS Applied Materials & Interfaces 2013 5 (20), 10035-10041 (Year: 2013).*

B. Fan, P. R. Bandaru; Anisotropy in the hydrophobic and oleophilic characteristics of patterned surfaces. Appl. Phys. Lett. Dec. 25, 2017; 111 (26): 261603. (Year: 2017).*

* cited by examiner

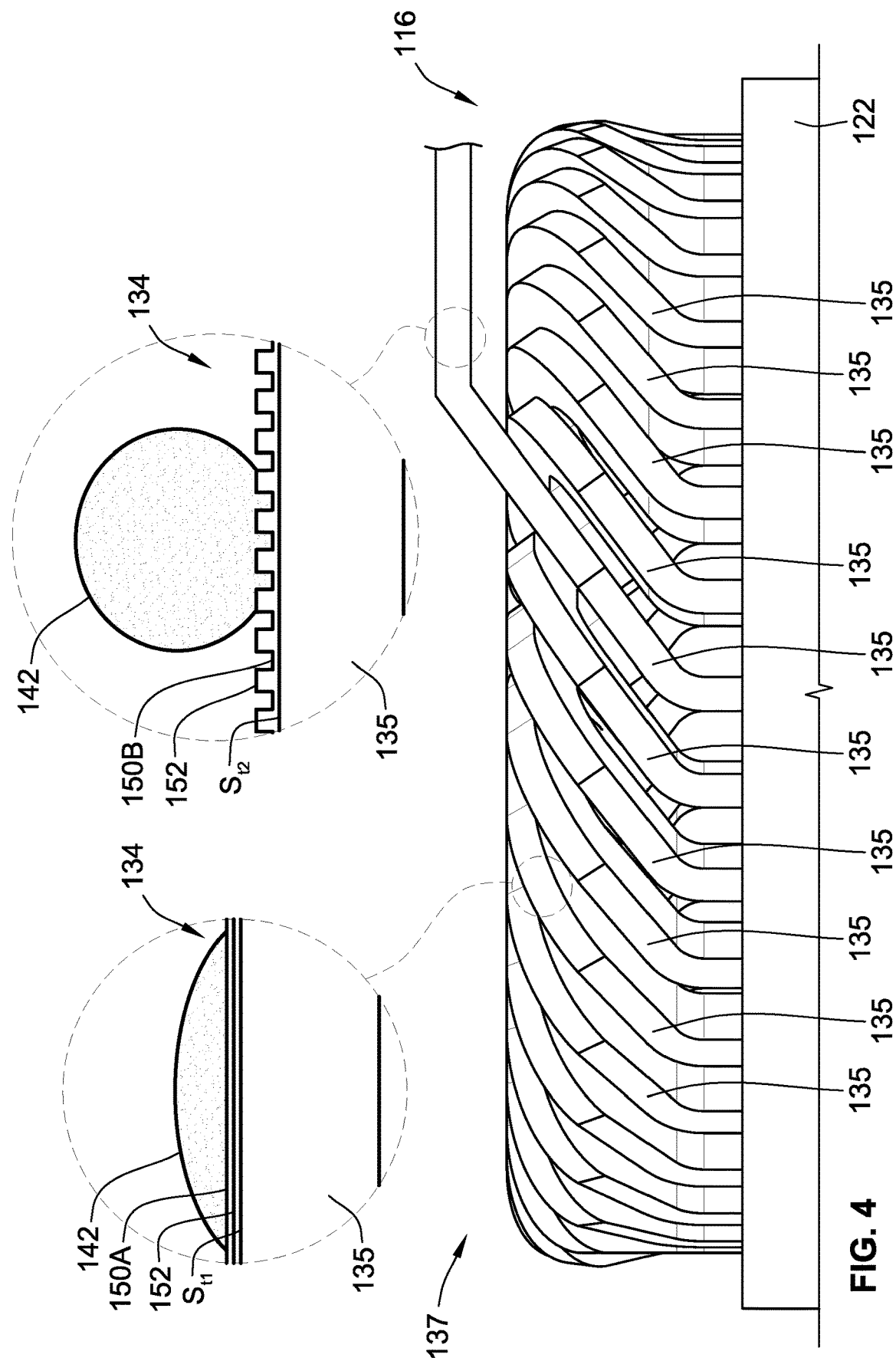

OLEOPHILIC SURFACE TREATMENTS FOR ENHANCED HEAT-TRANSFER CHARACTERISTICS OF ELECTRIC MACHINES

INTRODUCTION

The present disclosure relates generally to electric machines. More specifically, aspects of this disclosure relate to surface features for enhancing the heat-transfer characteristics of oil-cooled electric traction motors.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two-, four-, and six-stroke architectures, and rotary engines, as some non-limiting examples. Hybrid electric and full electric (collectively "electric-drive") vehicles, on the other hand, utilize alternative power sources to propel the vehicle and, thus, minimize or eliminate reliance on a fossil-fuel based engine for tractive power.

A full-electric vehicle (FEV)—colloquially an "electric car"—is a type of electric-drive vehicle configuration that altogether omits the internal combustion engine and attendant peripheral components from the powertrain system, relying on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

High-voltage (HV) electrical systems govern the transfer of electricity between the traction motor(s) and a rechargeable traction battery pack that stores and supplies the requisite power for operating many hybrid and full-electric powertrains. A contemporary traction battery pack may group stacks of battery cells (e.g., 8-16 cells/stack) into individual battery modules (e.g., 10-40 modules/pack) that are electrically interconnected in series or parallel and mounted onto the vehicle chassis, e.g., by a battery pack housing or support tray. Located on a battery side of the HV electric system is a front-end DC-to-DC power converter that is electrically connected to the traction battery pack(s) in order to increase the supply of voltage to a main DC bus and a DC-to-AC power inverter module (PIM). A high-frequency bulk capacitor may be arranged across the positive and negative terminals of the HV main DC bus to provide electrical stability and store supplemental electrical energy. A dedicated Electronic Battery Control Module (EBCM), through collaborative operation with a Powertrain Control Module (PCM) and each motor's power electronics package, governs operation of the battery pack(s) and traction motor(s).

There are three primary types of electric machines used for traction motors in modern electric-drive vehicle powertrains: brushed direct current (DC) motors, brushless DC permanent magnet (PM) motors, and multiphase alternating current (AC) PM motors. An ACPM motor is an electric machine that converts electrical energy into rotational mechanical energy using a stator with multiphase electromagnetic windings and a rotatable rotor that bears an arrangement of permanent magnets. In a radial-flux PM motor design, the magnet-bearing rotor may be coaxially nested inside the stator and the stator immovably mounted inside a motor housing. Alternatively, a PM motor may take on an axial flux arrangement in which the stator and rotor are facing, coaxial disks. The rotor, which has multiple surface-mounted or interior-mounted permanent magnets, is separated from the stator by a small air gap. Rotation of the rotor is effected by a magnetic field—produced by the flow of current through the stator windings—interacting with a magnetic field produced by the rotor's permanent magnets. During operation of a PM motor, rotational friction of the spinning rotor and electrical resistance of the electromagnetic stator generates a significant amount of heat. To improve motor efficiency and increase the motor's operational life expectancy, heat generated by the rotor and stator can be mitigated by an air-cooling, water-cooling, or oil-cooling thermal management system.

SUMMARY

Presented herein are oleophilic surface treatments for electric machines, methods for making and methods for using electric machines with oleophilic surface treatments, and electric-drive vehicles employing traction motors having multiphase stator windings with target surfaces having oleophilic treatments. In a non-limiting example, a polyphase electric motor/generator unit (MGU) employs a direct-oil-cooling thermal management system with a coolant jacket that encases the axial ends of the concentrically aligned rotor and stator. Pressurized or gravity-fed dielectric oil is pumped into the coolant jacket from a dedicated or communal sump volume; the oil is directed across the hairpin crowns (also known as "end-turns") of the multiphase windings that are projecting from an axial end of the stator. To increase coolant mass, surface energy, and wetted area on target surfaces of the windings, an oleophilic coating or surface texturization is applied over the entire multiphase stator winding or to select segments of the hairpin crown and/or legs. The oleophilic surface treatment may include an ultraviolet (UV) ozone treatment, a UV/plasma/flame/acid surface etching, and/or chemical deposition of inorganic silane or dodecyltrimethoxysilane (DTMS). The surface treatment may be applied over a resin coating, a varnish coating, or other dielectric layer applied onto the target surface. In addition, by selectively reducing the contact angle between the oil and target surface, there is a visible increase in oil distribution with a concomitant increase in total wetted area and a reduction in peak and average temperature.

Attendant benefits for at least some of the disclosed concepts include oleophilic surface treatments for electric machines that help to improve system cooling efficiency. By increasing wetted area and coolant mass of a target surface, for example, the requisite coolant fluid for maintaining a calibrated maximum or average operating temperature is reduced, which realizes a resultant decrease in system coolant charge. With less coolant in the thermal management system, energy-expenditures for operating the system pumps are reduced, which leads to improvements in overall vehicle efficiency and increased driving range. In addition, reducing a contact angle between the dielectric oil and the target surface (e.g., to about 35 degrees or less) provisions a measurable increase in oil distribution across neighboring target surfaces with a marked increase in total wetted area with an attendant reduction in peak and average temperature.

Aspects of this disclosure are directed to electric machines, such as motors, generators, transformers, inductors, dynamometers, converters, etc., with oleophilic surface treatments on one or more target surfaces. By way of example, a representative electric machine includes a protective outer housing that is selectively cooled by a direct-cooling thermal management system. The thermal management system is fluidly connected to the outer housing and operable to circulate thereto a coolant fluid, such as an engineered full-immersion liquid coolant or a lubricating dielectric transmission oil. Attached to the outer housing is a stator assembly that includes one or more electromagnetic windings, such as multiphase U-shaped hairpin windings, mounted to a stationary stator core. A rotor assembly is movably mounted adjacent the stator assembly, e.g., within the outer housing. For at least some applications, the rotor assembly is rotatably disposed inside of and, thus, circumscribed by the stator assembly. The rotor assembly includes one or more magnets, such as individual permanent magnet bars, mounted to a rotor core in spaced relation to the stator winding(s). The stator assembly includes one or more target surfaces with an oleophilic surface treatment that is designed to enlarge a wetted area of the target surface while also increasing a coolant mass of the coolant fluid contacting the target surface.

Additional aspects of this disclosure are directed to motor vehicles employing traction motors with multiphase stator windings having oleophilic surface treatments. As used herein, the terms "vehicle" and "motor vehicle" may be used interchangeably and synonymously to include any relevant vehicle platform, such as passenger vehicles (ICE, REV, FEV, FCH, fully and partially autonomous, etc.), commercial vehicles, industrial vehicles, tracked vehicles, off-road and all-terrain vehicles (ATV), motorcycles, e-bikes, e-scooters, farm equipment, watercraft, aircraft, etc. For non-automotive applications, disclosed concepts may be employed for any logically relevant use, including stand-alone power stations, commercial or residential generators, pumping equipment, machine tools, appliances, etc. In an example, a motor vehicle includes a vehicle body with a passenger compartment, multiple road wheels rotatably mounted to the vehicle body (e.g., via wheel corner modules coupled to a unibody chassis or body-on-frame chassis), and other standard original equipment. For electric-drive vehicle applications, one or more electric traction motors operate alone (e.g., for FEV powertrains) or in conjunction with an internal combustion engine assembly (e.g., for HEV powertrains) to selectively drive one or more of the road wheels to thereby propel the vehicle.

Continuing with the discussion of the above example, each traction motor includes a motor housing that is fluidly connected to a dedicated or shared direct-oil-cooling thermal management system to receive therefrom a dielectric oil. A stator assembly, which is rigidly mounted inside the motor housing, includes an annular stator core with a hollow center and multiple stator slots circumferentially spaced around the stator core. A series of U-shaped electromagnetic hairpin windings are packaged at least partially inside the stator slots. Rotatably disposed inside the hollow center of the annular stator core is a rotor assembly that includes a cylindrical rotor core with multiple rotor slots circumferentially spaced around the rotor core. An array of permanent magnets is mounted at least partially inside the rotor slots in spaced relation to the hairpin windings. Each hairpin winding has one or more target surfaces with an oleophilic surface treatment that enlarges a wetted area of the target surface while concomitantly increasing a coolant mass of the coolant fluid contacting the target surface.

Other aspects of this disclosure are directed to manufacturing processes, control logic, and computer-readable media (CRM) for making or using any of the disclosed electric machines, PM motors, and/or vehicles. In an example, a method is presented for assembling an electric machine. This representative method includes, in any order and in any combination with any of the above and below disclosed options and features: providing an outer housing of the electric machine; fluidly connecting a direct-cooling thermal management system to the outer housing to circulate thereto a coolant fluid; attaching a stator assembly to the outer housing, the stator assembly including a stator core and an electromagnetic winding mounted to the stator core; applying an oleophilic surface treatment to a target surface of the stator assembly, the oleophilic surface treatment configured to enlarge a wetted area of the target surface and increase a coolant mass of the coolant fluid contacting the target surface; and movably mounting a rotor assembly adjacent the stator assembly, the rotor assembly including a rotor core and a magnet mounted to the rotor core spaced from the winding.

For any of the disclosed electric machines, vehicles, and methods, only the electromagnetic winding(s) of the stator assembly includes a target surface with an oleophilic surface treatment. In a more specific, yet non-limiting example, the electromagnetic winding is manufactured with a pair of hairpin legs that project from a hairpin crown; these hairpin legs extend through stator slots in the stator core. In this instance, only exposed segments of the hairpin crown and/or legs that protrude from the axial ends of the stator core include a target surface with an oleophilic surface treatment. Prior to, contemporaneous with, or after the oleophilic surface treatment, each winding may optionally be covered with a varnish coating, e.g., to insulate the winding from contaminants and to facilitate dissipation of heat.

For any of the disclosed electric machines, vehicles, and methods, the oleophilic surface treatment includes a UV ozone treatment that is applied onto the electromagnetic winding. It may be desirable that only the exposed segments of the hairpin crown and legs protruding from the stator core have the UV ozone treatment, which may be applied onto the varnish coating. As yet another option, the oleophilic surface treatment may include a chemical deposition treatment of an inorganic compound that is applied onto the electromagnetic winding. The inorganic compound may include a silane-based material and/or a dodecyltrimethoxysilane-based material. It may be desirable that only the exposed segments of the hairpin crown and legs have the inorganic compound surface treatment, which may be applied via chemical deposition onto the varnish coating. The surface treatment may have a thickness of about 5 microns to about 0.1 mm.

For any of the disclosed electric machines, vehicles, and methods, the oleophilic surface treatment includes a surface etching with an isotropic pattern applied onto the winding. The surface etching may include an ultraviolet etching, a plasma etching, a flame etching, and/or an acid etching. It may be desirable that only the exposed segments of the hairpin crown and legs include the surface etching, which may be applied onto the varnish coating. The surface etching may include a series of mutually parallel grooves, each of which is recessed into an exposed segment of a hairpin crown/leg.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features described above and below.

BRIEF DESCRIPTION OF THE DRAWINGS

FIG. 4 is an enlarged, perspective-view illustration of a select portion of the representative stator assembly of FIGS. 2 and 3 with inset views showing enlarged sections of the hairpin windings with oleophilic surface treatments in accord with aspects of the disclosed concepts.

Figure 1:
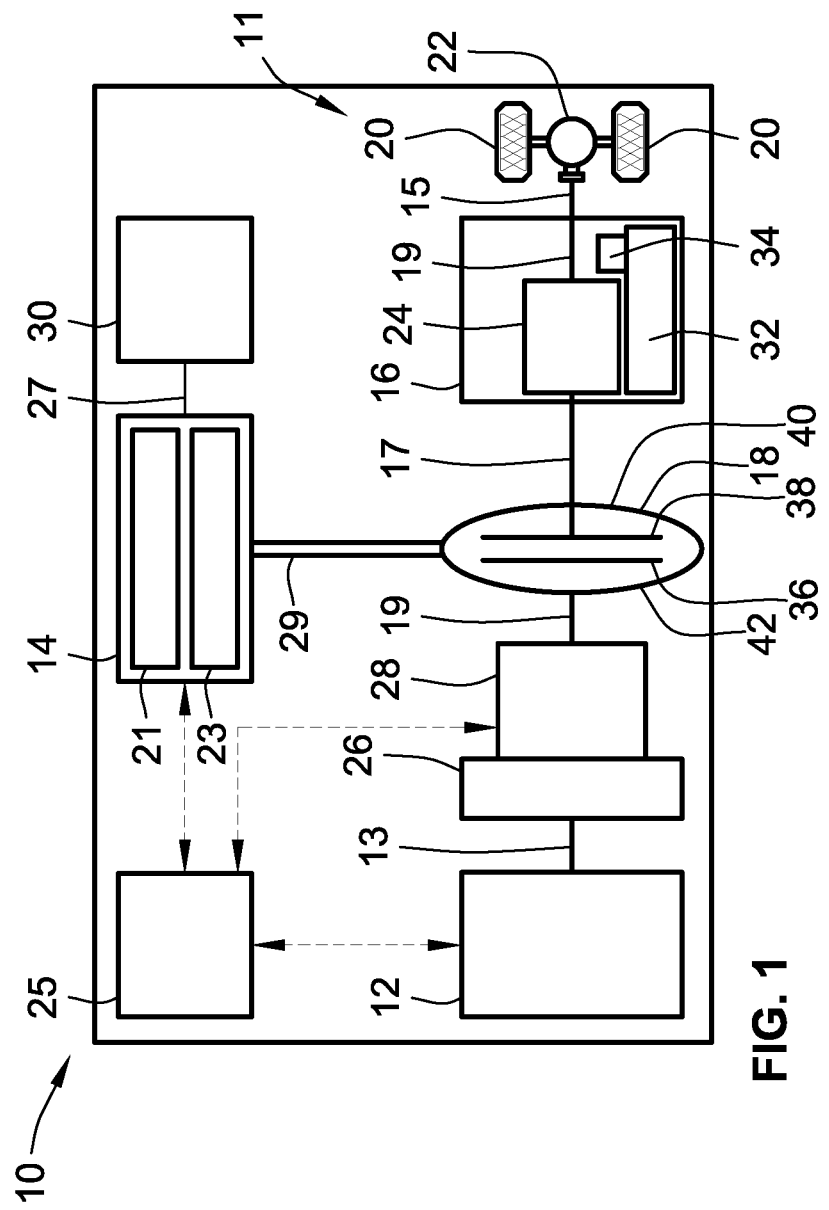
FIG. 1 is a schematic illustration of a representative electric-drive vehicle equipped with a hybrid electric powertrain having a multi-phase induction motor/generator unit (MGU) with a hairpin-wound stator bearing electrically conductive hairpin windings with oleophilic surface treatments in accordance with aspects of the present disclosure.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a parallel two-clutch (P2) hybrid-electric powertrain. The illustrated automobile 10—also referred to herein as "motor vehicle" or "vehicle" for short—is merely an exemplary application with which novel aspects of this disclosure may be practiced. In the same vein, implementation of the present concepts into a hybrid electric powertrain should also be appreciated as a representative implementation of the novel concepts disclosed herein. As such, it will be understood that facets of the present disclosure may be applied to other powertrain architectures, incorporated into any logically relevant type of motor vehicle, and utilized for both automotive and non-automotive applications alike. Lastly, only select components have been shown and will be described in additional detail herein. Nevertheless, the electric machines and motor vehicles discussed below may include numerous additional and alternative features, and other available peripheral components, for carrying out the various methods and functions of this disclosure.

The representative vehicle powertrain system is shown in FIG. 1 with a prime mover—represented herein by a restartable internal combustion engine (ICE) assembly 12 and an electric motor/generator unit (MGU) 14—that drivingly connects to a driveshaft 15 of a final drive system 11 by a multi-speed automatic power transmission 16. The engine 12 transfers power, preferably by way of torque via an engine crankshaft 13 ("engine output member"), to an input side of the transmission 16. Engine torque is first transmitted via the crankshaft 13 to rotate an engine-driven torsional damper assembly 26, and concomitantly transferred through the torsional damper assembly 26 to an engine disconnect device 28. This engine disconnect device 28, when operatively engaged, transmits torque received from the ICE assembly 12, by way of the damper 26, to input structure of a torque converter (TC) assembly 18. As the name implies, the engine disconnect device 28 may be selectively disengaged to drivingly disconnect the engine 12 from the MGU 14 (also referred to herein as "traction motor" or simply "motor"), TC assembly 18, and transmission 16.

To propel the hybrid vehicle 10, the transmission 16 is adapted to receive, selectively manipulate, and distribute tractive power received from the engine 12 and motor 14 to the vehicle's final drive system 11, which is represented herein by a driveshaft 15, rear differential 22, and a pair of rear road wheels 20. The power transmission 16, motor 14, and torque converter 18 of FIG. 1 may share a common transmission oil pan or "sump" 32 for supply of hydraulic fluid. A shared transmission pump 34 provides sufficient hydraulic pressure for the fluid to selectively actuate hydraulically activated elements of the transmission 16, the TC assembly 18 and, for some implementations, the engine disconnect device 28. It may be preferable, for at least some embodiments, that the engine disconnect device 28 comprise an active clutching mechanism, such as a controller-actuated selectable one-way clutch (SOWC) or friction-plate clutch, or a passive clutching mechanism, such as a ratchet-and-pawl or sprag-type freewheel OWC assembly.

The ICE assembly 12 operates to propel the vehicle 10 independently of the electric traction motor 14, e.g., in an "engine-only" operating mode, or in cooperation with the motor 14, e.g., in "vehicle-launch" or "motor-boost" operating modes. In the example depicted in FIG. 1, the ICE assembly 12 may be any available or hereafter developed engine, such as a compression-ignited diesel engine or a spark-ignited gasoline or flex-fuel engine, which is readily adapted to provide its available power output typically at a number of revolutions per minute (RPM). Although not explicitly portrayed in FIG. 1, it should be appreciated that the final drive system 11 may take on any available configuration, including front wheel drive (FWD) layouts, rear wheel drive (RWD) layouts, four-wheel drive (4WD) layouts, all-wheel drive (AWD) layouts, six-by-four (6×4) layouts, etc.

FIG. 1 also depicts an electric motor/generator unit ("motor") 14 that operatively connects via a motor support hub, shaft, or belt 29 ("motor output member") to the hydrodynamic torque converter 18. The torque converter 18, in turn, drivingly connects the motor 14 to an input shaft 17 ("transmission input member") of the transmission 16. The electric MGU 14 is composed of an annular stator assembly 21 circumscribing and concentric with a cylindrical rotor assembly 23. Electric power is provided to the stator 21 through a high-voltage electrical system, including electrical conductors/cables 27 that pass through the motor housing via suitable sealing and insulating feedthroughs (not illustrated). Conversely, electric power may be provided from the MGU 14 to an onboard traction battery pack 30, e.g., through regenerative braking. Operation of any of the illustrated powertrain components may be governed by an onboard or remote vehicle controller, such as programmable electronic control unit (ECU) 25. While shown as a P2 hybrid-electric architecture with a single motor in parallel power-flow communication with a single engine assembly, the vehicle 10 may employ other HEV powertrain configurations, including P0, P1, P2.5, P3 and P4 hybrid powertrains, or may be adapted for a BEV, PHEV, range-extended vehicle, fuel-cell hybrid vehicle, FEVs, etc.

Power transmission 16 may use differential gearing 24 to achieve selectively variable torque and speed ratios between transmission input and output shafts 17 and 19, respectively, e.g., while sending all or a fraction of its power through the variable elements. One form of differential gearing is the epicyclic planetary gear arrangement. Planetary gearing offers the advantage of compactness and different torque and speed ratios among all members of the planetary gearing subset. Traditionally, hydraulically actuated torque establishing devices, such as clutches and brakes (the term "clutch" used to reference both clutches and brakes), are selectively engageable to activate the aforementioned gear elements for establishing desired forward and reverse speed ratios between the transmission's input and output shafts 17, 19. While envisioned as an 8-speed automatic transmission, the power transmission 16 may optionally take on other functionally appropriate configurations, including Continuously Variable Transmission (CVT) architectures, automated-manual transmissions, etc.

Hydrokinetic torque converter assembly 18 of FIG. 1 operates as a fluid coupling for operatively connecting the engine 12 and motor 14 with the internal epicyclic gearing 24 of the power transmission 16. Disposed within an internal fluid chamber of the torque converter assembly 18 is a bladed impeller 36 juxtaposed with a bladed turbine 38. The impeller 36 is situated in serial power-flow fluid communication in juxtaposition with the turbine 38, with a stator (not shown) interposed between the impeller 36 and turbine 38 to selectively alter fluid flow therebetween. The transfer of torque from the engine and motor output members 13, 29 to the transmission 16 via the TC assembly 18 is through stirring excitation of hydraulic fluid, such as transmission oil, inside the TC's internal fluid chamber caused by rotation of the impeller and turbine 36, 38 blades. To protect these components, the torque converter assembly 18 is constructed with a TC pump housing, defined principally by a transmission-side pump shell 40 fixedly attached, e.g., via electron beam welding, MIG or MAG welding, laser welding, and the like, to an engine-side pump cover 42 such that a working hydraulic fluid chamber is formed therebetween.

Figure 2:
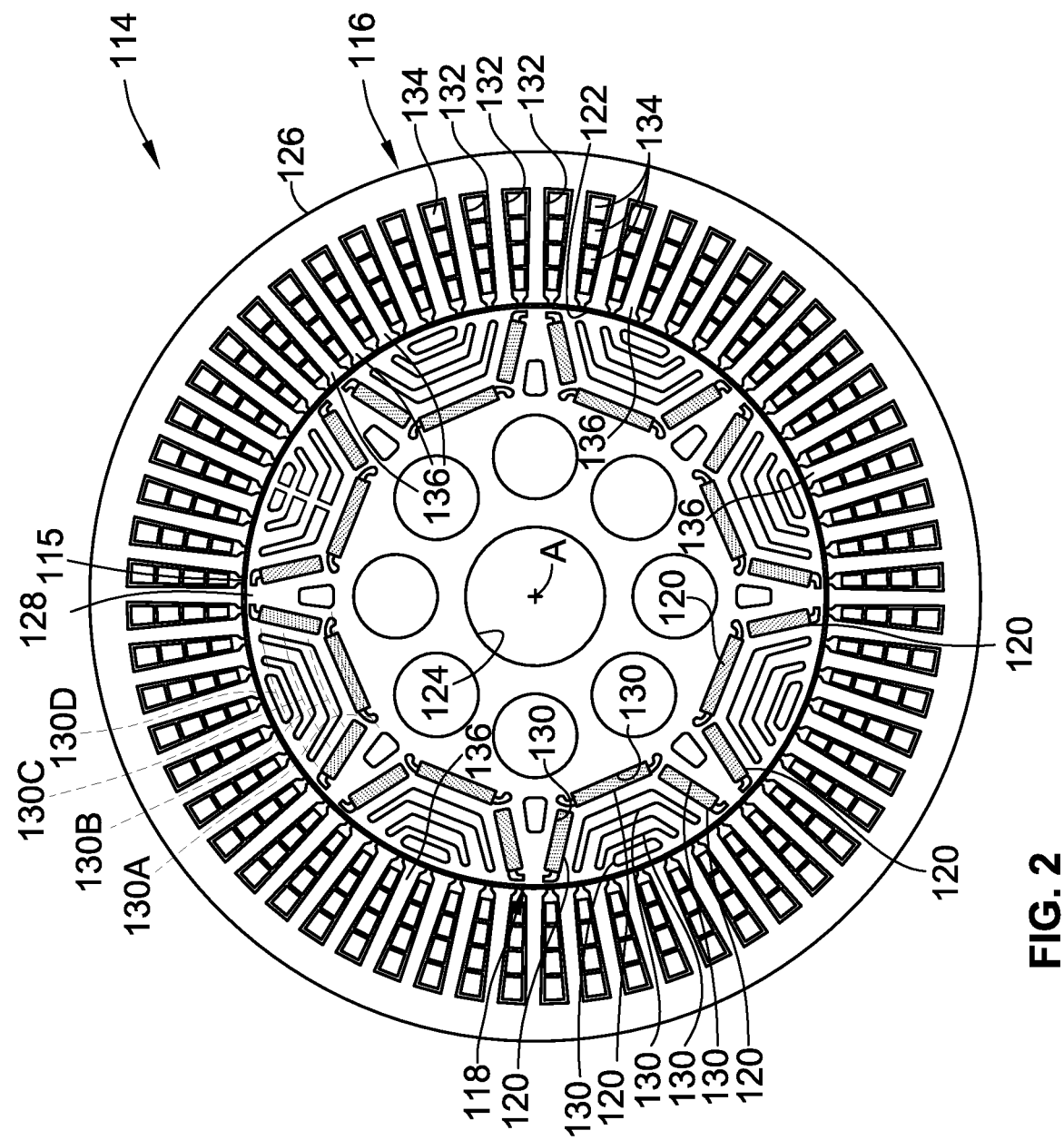
FIG. 2 is a schematic end-view illustration of a representative electric motor with a rotor assembly including a rotor core bearing multiple permanent magnets and a stator assembly with an annular stator ring bearing multiple hairpin windings with oleophilic surface treatments in accordance with aspects of the present disclosure.

FIG. 2 illustrates another example of an electric machine 114 that employs magnetic material for exchanging electromagnetic forces with conductive windings to convert electrical energy into mechanical energy. As discussed below, the electric machine 114 utilizes a multiphase, hairpin-wound stator assembly 116 that nests therein and circumscribes a PM-bearing synchronous reluctance rotor assembly 118. While available for use in automotive and non-automotive applications alike, the electric machine 114 of FIG. 2 may be particularly suited for use in a hybrid-electric powertrain as a traction motor (e.g., motor 14 FIG. 1) with an engine (e.g., ICE assembly 12), and to operate in at least an engine-cranking mode, a regenerative-charging mode, and a torque-assist mode. Electric machine 114 may be designed to achieve: a relatively high efficiency, such as at least about 85% efficiency over a calibrated output power and speed range; a relatively high power density (e.g., greater than about 1500 watts per liter) and torque density (e.g., greater than about 5 Newton-meters per liter); a relatively wide peak power range (e.g., about 4 to 6 kilowatts or greater); a maximum speed of at least about 18,000 rpm; a reduced mass and inertia (e.g., for fast dynamic response to user output demands); and to fit into a relatively small packaging space. Various alternative embodiments, including alternative rotor assembly architectures and/or alternative stator assembly architectures, may be employed by the electric machine 114 to meet similar or alternative operating parameters.

With continuing reference to FIG. 2, the stator assembly 116 is coaxial with and surrounds the rotor assembly 118 while maintaining a small air gap 115 therebetween. In accord with the illustrated example, this air gap 115 may be not less than about 0.2 millimeters (mm) and not greater than about 1.0 mm, for example, in order to maximize power output and minimize the number of permanent magnets 120 borne by the rotor assembly 118 to provide the desired power output. The representative stator and rotor assemblies 116, 118 of FIG. 2, both of which are portrayed as truncated right-circular cylinders with a generally annular shape, are concentrically aligned about a longitudinal center axis A of the electric machine 114. The stator assembly 116 has a hollow stator core 122 that nests therein the rotor assembly 118; the rotor assembly 118 has a hollow rotor core 124, e.g., that keys, splines, welds, etc., to a motor shaft (e.g., motor output member 29 of FIG. 1). A protective motor housing may surround an outer periphery of the stator's body 126 and can support the motor shaft of the electric machine 114.

Rotor assembly 118 of FIG. 2 is fabricated with a rotor body 128 for supporting multiple permanent magnets 120 (twenty-four (24) PMs in the illustrated example) that are circumferentially spaced around the rotor core 124. Specifically, the rotor body 128 is stamped, precision machined, and assembled with multiple rotor slots 130 arranged in radially spaced barrier layers (e.g., four distinct barrier layers). A first barrier layer 130A of slots 130 may be positioned closest to an inner periphery of the rotor body 128, while a fourth barrier layer 130D of slots 130 may be positioned furthest from the rotor body's inner periphery than the other barrier layers. A second barrier layer 130B of slots 130 may be radially interposed between the first and third barrier layers 130A, 130C, while the third barrier layer 130C of slots 130 may be radially interposed between the second and fourth barrier layers 130B, 130D. For at least some embodiments, only select barrier layers (e.g., the first and third barrier layers 130A, 130C) may house magnets 120, while other select barrier layers (e.g., the second and fourth barrier layers 130B, 130D) do not house magnets 120 and, thus, act as flux barriers. In other embodiments, only one or all of the barrier layers may comprise slots storing therein permanent magnets. The rotor body 128 may be fabricated from a metallic material, including a high-grade steel material, which is engineered to maintain high-speed rotational stress within predetermined limits.

Stator assembly 116 of FIG. 2 is fabricated with a stator body 126 that has multiple axially elongated and radially aligned stator slots 132 (e.g., 60 total slots) that are circumferentially spaced around the stator body 126. Each stator slot 132 extends longitudinally through the stator body 126 along the rotational axis A of the electric machine 114. The stator slots 132 house complementary legs of electrically conductive, multiphase stator windings 134. Stator windings 134—also referred to herein as "hairpin windings"—may be grouped into different sets, each of which may carry an identical number of phases of electrical current, such as three, five, six, or seven phases. In addition, the stator windings 134 may extend axially beyond the longitudinal ends of the stator body 126. A ratio of an outer diameter of the stator body 126 to an axial length of the stator assembly 116 (i.e., the distance along the axis A between the body's longitudinal ends not including any extending portion of the stator windings 134) may be not less than 1.5 and not greater than 3.5, for example, to satisfy predetermined packing space constraints for a particular application of the electric machine 114.

For ease of manufacture, simplified assembly, and increased costs savings, it may be desirable that all of the permanent magnets 120 share an identical, rectangular polyhedron shape. It should be recognized, however, that any one or more or all of the PM bodies may take on innumerable shapes and sizes, including other polyhedral block-type magnets, ring-shaped (annular) magnets, bread-loaf block-type magnets (cross-section with quadrilateral section adjoining semioval section), curved tile magnets, etc. In one non-limiting example, each permanent magnet 120 may have a thickness of about 1.5 mm to 2.5 mm to fit within a slot 130 having complementary dimensions. In at least one embodiment, a total mass of magnet material (i.e., the mass of all magnets 120) used by the electric machine 114 may be about 150 grams to about 250 grams. The permanent magnets 120 of the electric machine 114 may all be fabricated from the same material, such as Neodymium Iron Boron (NdFeB); alternatively, any one or more or all of the magnets 120 may employ different materials, such as Samarium Cobalt (SmCo), Aluminum Nickel Cobalt (AlNiCo), or any combination of rare earth magnet materials.

Figure 3:
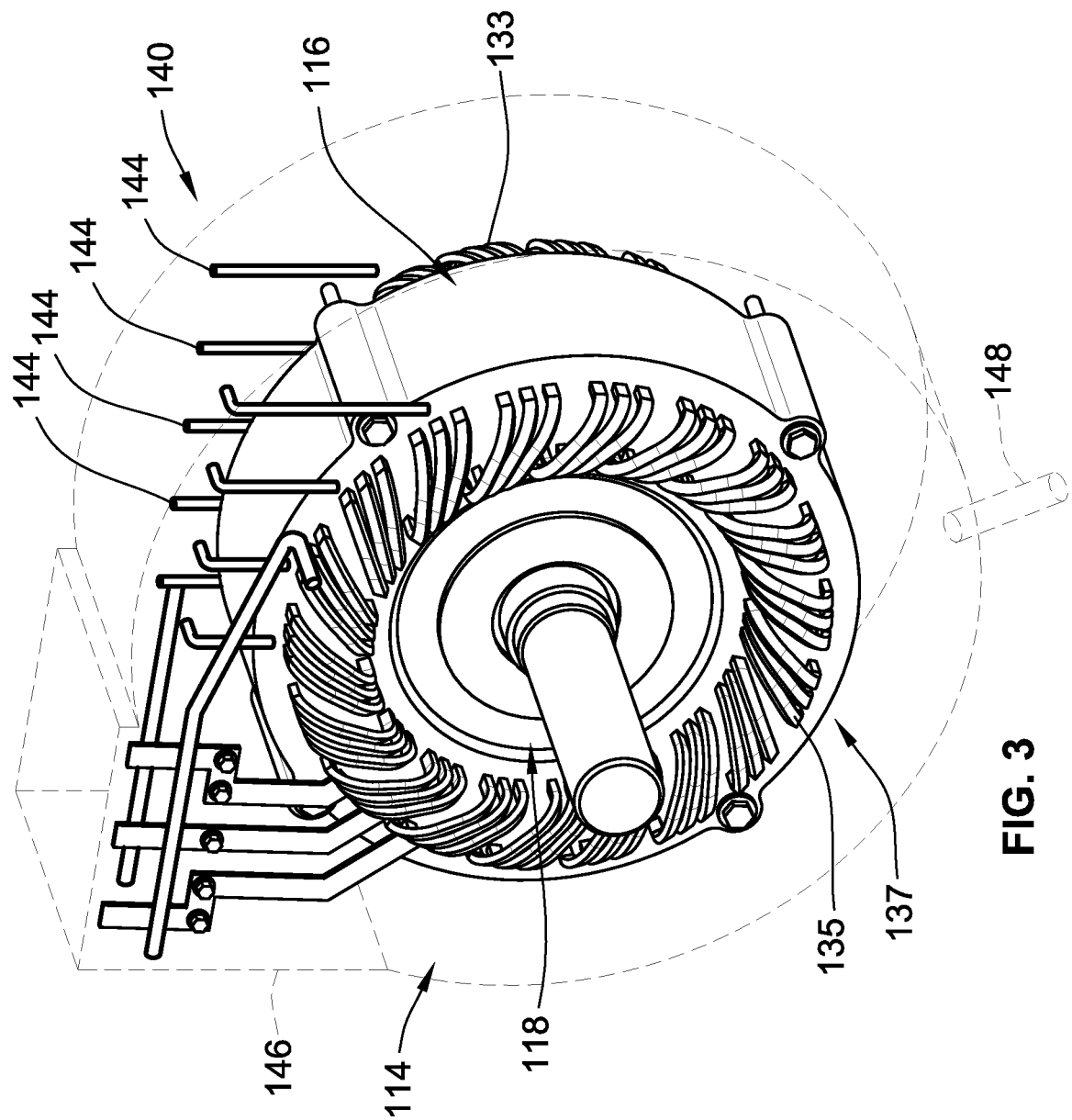
FIG. 3 is an elevated, perspective-view illustration of the representative electric motor of FIG. 2 with a direct-oil-cooling thermal management system.

Similar to the permanent magnets 120 of FIG. 2, it may be desirable that all of the multiphase stator windings 134 share an identical construction, including material composition, method of manufacture, and final geometry. Each stator winding 134 may be fabricated from a unitary bar conductor, which is formed into a U-shaped geometry that is defined by a pair of hairpin legs 133 (FIG. 3) that are parallel to each other and project from opposing ends of a curvilinear hairpin crown 135 (FIG. 4). The hairpin legs 133 are inserted into the slots 132 of the stator body 126, with each leg 133 extending through a different stator slot 132 such that the hairpin crown 135 (also known as an "end-turn") extends over several of the stator slots 132 (e.g., a crown may extend across three, four, or five slots). Sets 137 of hairpin stator windings 134 may be inserted in a "staggered" or "interleaved" pattern with respect to adjacent hairpins, as best seen in FIG. 3. Any given stator slot 132 may include a number of hairpin legs 133 (e.g., four in the illustrated example of FIG. 2). Once all of the hairpin windings 134 are inserted into the slots 132 of the stator body 126, the ends of the hairpin legs 133 obtruding from a longitudinal end of the stator core 122 are bent; electrical connections are then made to each winding 134.

During operation of the electric machine 114, e.g., in a regenerative-charging mode, the rotor assembly 118 is rotated via the motor shaft while the stator assembly 116 is held relatively stationary. In so doing, the permanent magnets 120 are moved past the multiphase stator windings 134; the magnetic field emitted by the permanent magnets 120 generates an electric current in the windings 134 through electromagnetic induction. This induced electric current may be used to power a load (e.g., recharge traction battery pack 30 of FIG. 1). Conversely, during operation of the electric machine 114, e.g., in an engine-cranking mode, an EV motoring mode, or a torque-assist mode, an electric current is supplied to the stator windings 134 by a suitable power source (e.g., traction battery pack 30). Passing the supplied current through the multiphase stator windings 134 will generate a magnetic field at the stator teeth 136. The magnetic field output from the stator teeth 136 interacts with the permanent magnets 120 in the rotor assembly 118 such that the rotor body 128 and attached motor shaft rotate to generate a rotary driving force.

FIG. 3 is a perspective-view illustration of the representative electric machine 114 of FIG. 2 operatively connected to a direct-oil-cooling thermal management system 140 for selectively cooling specific components within the motor assembly. In a direct cooling system, a coolant fluid 142 (FIG. 4), such as an engineered full-immersion liquid coolant or a lubricating dielectric transmission oil (e.g., pumped from transmission oil pan 32), contacts a heated "target" surface $S_{T1}$ or $S_{T2}$ of a component to directly extract heat from that component. As described above with respect to FIG. 1, for example, an electric machine 114—when configured as a motor/generator unit 14—may be cooled via a common cooling circuit that is shared with the vehicle transmission 16. Alternative architectures may employ a dedicated cooling circuit, not in fluid communication with the transmission 16, to cool the MGU 14. Irrespective of whether a communal system or a dedicated system is utilized, coolant fluid 142 is delivered through one or more coolant fluid inlets 144 into a cooling jacket section of a protective outer motor housing 146 of the electric machine 114. This coolant fluid 142 is distributed across exposed segments of the multiphase stator winding's 134 crown and/or legs that protrude from the axial ends of the stator core 122. After cooling the electric machine 114, the heat-entrained oil is expelled from the electric machine 114 through one or more coolant fluid outlets 148 in the motor housing 146.

For maximum cooling efficiency, it is often desirable to direct the largest possible volume and mass of coolant fluid onto a target surface of a component being cooled. Moreover, as heat transfer typically increases linearly with wetted area, it is generally desirable to direct coolant fluid over the largest possible contact area of a target surface of the component being cooled. Presented herein are oleophilic surface coatings and texturizations that are engineered to enhance the cooling efficiency of a direct-contact coolant fluid that is cooling the subject component. These oleophilic surface treatments help to increases surface energy and wetted area of the target surface, which in turn helps to retain the coolant on the target surface with a concomitant increase in coolant mass on the target surface. As used herein, the term "wetted area" may be defined to include the ordinary and customary meaning accorded to it by those of ordinary skill in the art, including a total surface area of a target surface that is immersed in, comes into direct contact with, or otherwise interfaces with a fluid medium. Likewise, the term "oleophilic" may be defined to include the ordinary and customary meaning accorded to it by those of ordinary skill in the art, including an object with a chemical affinity to oil and oil-based substances with a concurrent chemical intolerance or aversion to water.

FIG. 4 illustrates one of the axial ends of the stator assembly 116 of FIGS. 2 and 3, showing the exposed hairpin crowns 135 of the multiphase stator windings 134 extending from the stator core 122. To facilitate efficient cooling of the stator windings 134 and, thus, the stator assembly 116 and machine 114, each winding 134 has a target surface that is manufactured with an oleophilic surface treatment. In at least some embodiments, only the exposed surfaces of the hairpin winding crowns are provided with an oleophilic surface treatment. It is also within the scope of this disclosure to apply an oleophilic surface treatment to other segments of the hairpin windings and other components of the electric machine 114, such as the exposed ends of the hairpin winding legs (FIG. 2), the axial faces of the stator core 122 and rotor core 124, or the outer circumferences of the stator core 122 and rotor core 124.

Disclosed oleophilic surface treatments enlarge the wetted area of its target surface while increasing the mass of the coolant fluid contacting the target surface. Inset within FIG. 4 are two non-limiting examples of oleophilic surface treatments: an oleophilic surface coating 150A and an oleophilic surface texturization 150B. Prior to or contemporaneous with application of the oleophilic surface coating 150A or texturization 150B (collectively referred to hereinbelow as "oleophilic surface treatment"), each of the hairpin windings 134 may be covered with a dielectric coating 152. The dielectric coating 152 may be a base oil-and-resin varnish that helps to protect the windings 134 from contaminants, insulate the windings 134 to prevent a short circuit, and to facilitate dissipation of heat from the winding sets 137. The oleophilic surface coating 150A may be formed using an ultraviolet irradiation and ozone (UV/O3) system that is either applied directly onto the electromagnetic winding 134 or, as shown, indirectly via application onto the dielectric coating 152. In this example, only the exposed surfaces of the hairpin legs 133 and crown 135 include the UV-ozone surface coating 150A applied onto the dielectric coating 152.

Continuing with the discussion of FIG. 4, the oleophilic surface coating 150A may include or, for any of the herein-described examples, may consist essentially of a chemical deposition treatment of an inorganic compound that is applied onto the electromagnetic winding 134. As shown, the inorganic compound is formed, in whole or in part, from a silane-based material and/or a dodecyltrimethoxysilane-based material. Similar to the UV ozone example, only exposed segments of the hairpin legs and/or crown 133, 135 are provided with the inorganic-compound surface coating 150A applied onto the dielectric coating 152. The oleophilic surface coating 150A may have a thickness of about 5 microns to about 0.1 mm.

Each multiphase stator winding 134—in addition or as an alternative to coating-based treatments—may be treated with an oleophilic surface texturization 150B. The outer surface of the winding 134 or, alternatively, the outer surface of the coating 152 on the winding 134 may be fabricated with a surface etching that exhibits isotropic wetting behavior and oleophilic characteristics when contacted by an oil-based dielectric coolant. The surface etching may be formed by any suitable technique, including an ultraviolet (UV) etching, a plasma etching, a flame etching, and/or an acid etching. Only the target surfaces of the hairpin legs/crown 133, 135 exposed at the ends of the stator core 122 are treated with the dielectric coating 152 and the surface-based surface texturization 150B applied onto the dielectric coating 152. In accord with the illustrated example, the surface etching may be typified by a series of mutually parallel grooves, each of which is recessed into the exposed segments of the hairpin crown 135 and legs 133.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed is:

1. An electric machine, comprising:
   an outer housing;
   a direct-cooling thermal management system fluidly connected to the outer housing and configured to circulate thereto a coolant fluid;
   a stator assembly attached to the outer housing and including a stator core with an electromagnetic winding mounted to the stator core, the electromagnetic winding including a crown with a leg projecting from the crown and extending through a stator slot in the stator core such that exposed segments of the crown and the leg protrude from the stator slot; and
   a rotor assembly movable with respect to the stator assembly and including a rotor core with a magnet mounted to the rotor core in spaced relation to the electromagnetic winding, wherein the electromagnetic winding has a target surface with an oleophilic surface treatment configured to enlarge a wetted area of the target surface and increase a coolant mass of the coolant fluid contacting the target surface, the oleophilic surface treatment including a surface etching configured to exhibit an isotropic wetting behavior, the surface etching covering substantially all of the exposed segments of both the crown and the leg, only the exposed segments of the crown and the leg of the electromagnetic winding including the surface etching.

2. The electric machine of claim 1, wherein the oleophilic surface treatment further includes a dielectric varnish-based coating on the crown and the leg, and wherein the surface etching is disposed on an outer surface of the dielectric coating.

3. The electric machine of claim 1, wherein the electromagnetic winding includes a pair of the legs projecting from the crown and extending through the stator core, and wherein the surface etching is disposed on the exposed segments of the crown and both of the legs.

4. The electric machine of claim 1, wherein the oleophilic surface treatment further includes an ultraviolet (UV) ozone treatment applied onto the electromagnetic winding.

5. The electric machine of claim 4, wherein the electromagnetic winding includes a pair of the legs projecting from the crown and extending through the stator core, and wherein only the exposed segments of the crown and the legs protruding from the stator core include a varnish coating with the UV ozone treatment applied to the varnish coating.

6. The electric machine of claim 1, wherein the oleophilic surface treatment further includes a chemical deposition treatment of an inorganic compound applied onto the electromagnetic winding.

7. The electric machine of claim 6, wherein the inorganic compound includes a silane-based material and/or a dodecyltrimethoxysilane-based material.

8. The electric machine of claim 6, wherein the electromagnetic winding includes a pair of the legs projecting from the crown and extending through the stator core, and wherein only the exposed segments of the crown and the legs protruding from the stator core include a varnish coating with the inorganic compound applied to the varnish coating.

9. The electric machine of claim 6, wherein the inorganic compound has a thickness of about 5 microns to about 0.1 mm.

10. The electric machine of claim 1, further comprising a dielectric coating on the electromagnetic winding, wherein the oleophilic surface treatment including the surface etching is applied onto the dielectric coating on the electromagnetic winding.

11. The electric machine of claim 1, wherein the surface etching is an ultraviolet etching, a plasma etching, a flame etching, and/or an acid etching.

12. The electric machine of claim 1, wherein the stator slot includes multiple stator slots, wherein the electromagnetic winding includes a pair of the legs projecting from the crown and extending through the stator slots in the stator core, and wherein only the exposed segments of the crown and legs protruding from the stator core include a varnish coating with the surface etching applied to the varnish coating.

13. The electric machine of claim 1, wherein the surface etching includes a series of mutually parallel grooves recessed into the exposed segments of the crown and the leg.

14. A motor vehicle comprising:
a vehicle body;
a plurality of road wheels attached to the vehicle body; and
a traction motor attached to the vehicle body and operable to drive one or more of the road wheels to thereby propel the motor vehicle, the traction motor including:
a motor housing;
a direct-oil-cooling thermal management system fluidly connected to the motor housing and configured to circulate thereto a dielectric oil;
a stator assembly mounted inside the motor housing, the stator assembly including an annular stator core defining a hollow center and a plurality of circumferentially spaced stator slots, and a plurality of U-shaped electromagnetic hairpin windings each including a crown with legs projecting from the crown and extending through the stator slots such that exposed segments of the crown and the legs protrude from the stator slots; and
a rotor assembly rotatably disposed inside the hollow center of the annular stator core, the rotor assembly including a cylindrical rotor core defining a plurality of circumferentially spaced rotor slots, and a plurality of permanent magnets mounted inside the rotor slots in spaced relation to the hairpin windings,
wherein each of the hairpin windings of the stator assembly has a respective target surface with an oleophilic surface treatment configured to enlarge a wetted area of the target surface and increase a coolant mass of the dielectric oil contacting the target surface, the oleophilic surface treatment including a surface etching configured to exhibit an isotropic wetting behavior, the surface etching covering the exposed segments of the crown and the legs, only the exposed segments of the crown and the legs including the surface etching.

15. A method of assembling an electric machine, the method comprising:
providing an outer housing of the electric machine;
fluidly connecting a direct-cooling thermal management system to the outer housing to circulate thereto a coolant fluid;
attaching a stator assembly to the outer housing, the stator assembly including a stator core and an electromagnetic winding mounted to the stator core, the electromagnetic winding including a crown with a leg projecting from the crown and extending through a stator slot in the stator core such that exposed segments of the crown and the leg protrude from the stator slot;
applying an oleophilic surface treatment to a target surface of the electromagnetic winding, the oleophilic surface treatment configured to enlarge a wetted area of the target surface and increase a coolant mass of the coolant fluid contacting the target surface, the oleophilic surface treatment including a surface etching configured to exhibit an isotropic wetting behavior, the surface etching covering substantially all of the exposed segments of the crown and the leg, only the exposed segments of the crown and the leg including the surface etching; and
movably mounting a rotor assembly adjacent the stator assembly, the rotor assembly including a rotor core and a magnet mounted to the rotor core spaced from the winding.

16. The method of claim 15, wherein the oleophilic surface treatment further includes a varnish coating on the crown and the leg, and wherein the surface etching is disposed on an outer surface of the dielectric coating.

17. The method of claim 15, wherein the stator slot includes multiple stator slots, wherein the electromagnetic winding includes a pair of the legs projecting from the crown and extending through one or more of the stator slots in the stator core, and wherein the surface etching is disposed on the exposed segments of the crown and the legs.

18. The method of claim 15, wherein the oleophilic surface treatment further includes an ultraviolet ozone treatment applied onto the target surface.

19. The method of claim 15, wherein the oleophilic surface treatment further includes an inorganic compound applied via a chemical deposition treatment onto the target surface.

20. The method of claim 15, further comprising applying a dielectric coating onto the electromagnetic winding, wherein the oleophilic surface treatment including the surface etching is applied onto the dielectric coating.

* * * * *